Figure 1:
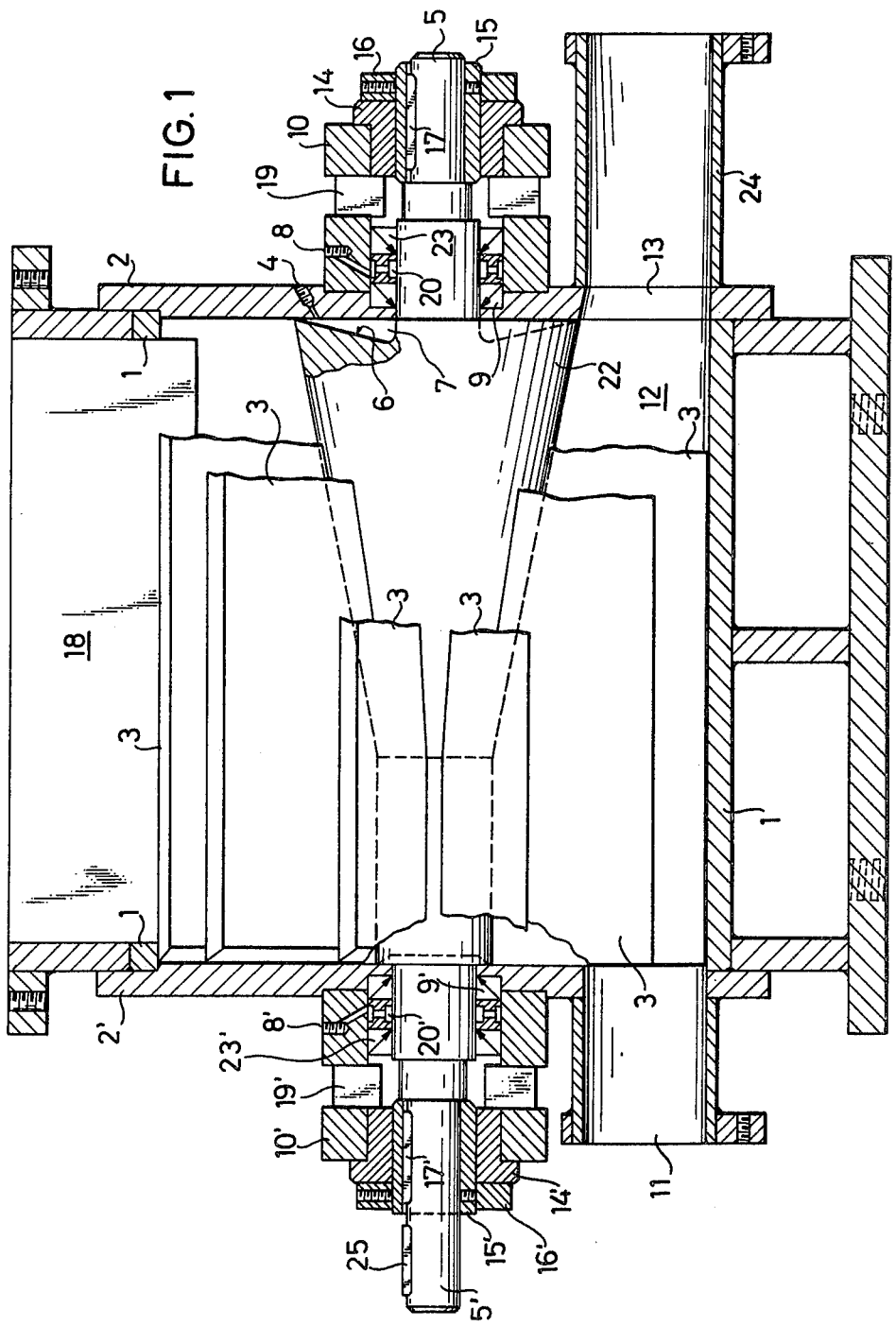

United States Patent [19]

Leurs et al.

[11] 4,015,754
[45] Apr. 5, 1977

[54] DOSING DEVICE WITH PNEUMATIC DISCHARGE FOR FLOWABLE SOLIDS

[75] Inventors: Gerardus Cornelis Leurs; Rumoldus Matthijs Marinos Johannes Bosma, both of Breda; Theodorus Johannes Antonius Pouw, Gilze, all of Netherlands

[73] Assignee: Hoechst Aktiengesellschaft, Frankfurt am Main, Germany

[22] Filed: June 12, 1975

[21] Appl. No.: 586,153

[30] Foreign Application Priority Data

June 14, 1974 Germany .......................... 2428579

[52] U.S. Cl. .................................. 222/194; 222/370
[51] Int. Cl.² ......................................... B65G 53/40
[58] Field of Search .............. 222/194, 370; 302/49

[56] References Cited
UNITED STATES PATENTS

| | | | |
|---|---|---|---|
| 2,314,031 | 3/1943 | Colburn | 222/194 X |
| 2,852,315 | 9/1958 | Lenhart | 302/49 |
| 3,273,758 | 9/1966 | Starrett | 222/194 |

Primary Examiner—Robert B. Reeves
Assistant Examiner—John P. Shannon
Attorney, Agent, or Firm—Curtis, Morris & Safford

[57] ABSTRACT

In a feeding device of the rotary valve type with pneumatic discharge of the pockets of a rotor in the direction parallel to a portion of the rotor hub of the rotor the shaft has a conical shape such that a conveying duct for the gas/solid mixture is formed by one pocket of the rotor, the wall of the rotor casing and the rotor hub, which duct diminishes in diameter from the gas inlet opening to the outlet opening for the gas/solid mixture, the said opening extending over two pockets of the rotor.

4 Claims, 2 Drawing Figures

DOSING DEVICE WITH PNEUMATIC DISCHARGE FOR FLOWABLE SOLIDS

The present invention relates to a material feeding device of the rotary valve type for pneumatic discharge of flowable solids that tend to agglomerate, for example due to adhering moisture.

Rotary valves having compartmented rotors and using pneumatic discharge in a direction parallel to the shaft of the rotor are known. With devices of this type compressed air is introduced through a tube into the valve casing at the lowest point thereof and the material to be conveyed is carried by the air from the lowest pocket of the rotor into oppositely located conveying tube. The drawback of the such rotary valves resides in the fact that the rotor has end surfaces which cause sealing problems and permit a vortical movement of the conveying air in the respective pockets of the rotor.

It is an object of the present invention to provide a feeding device of the rotary valve type with pneumatic discharge of the pockets of the rotor in which, during the discharge, accumulation of material in the pockets of the rotor is avoided and the sealing problem at the end surfaces of the rotor is substantially solved.

The present invention provides a feeding device of the rotary valve type for flowable solids with pneumatic discharge of the pockets of the rotor in a direction parallel to at least a portion of the hub of the said rotor, wherein the shaft of the rotor has a conical shape so that a conveying channel for the air/solid mixture is formed by a pocket of the rotor and the wall of the rotor casing, the cross sectional area of the said channel diminishing from the air inlet towards the outlet of the air/solid mixture, and the discharge opening for the said mixture extends over at least two pockets of the rotor.

To prevent product leakage the hub of the rotor has a stub shaft at each end thereof, and at least one of the circular end planes of the hub is recessed to form an annular duct between the side plate of the valve casing and the hub, into which duct compressed air is blown through an inlet.

The rotor can also be positioned in conical casing. The conical hub may have the shape of a circular cone or of a pyramid with at least three faces. To prevent the formation of pores and avoid abrasion in the casing, all parts that come into contact with the conveyed material are advantageously covered with a hard chromium coating or the like.

Figure 2:
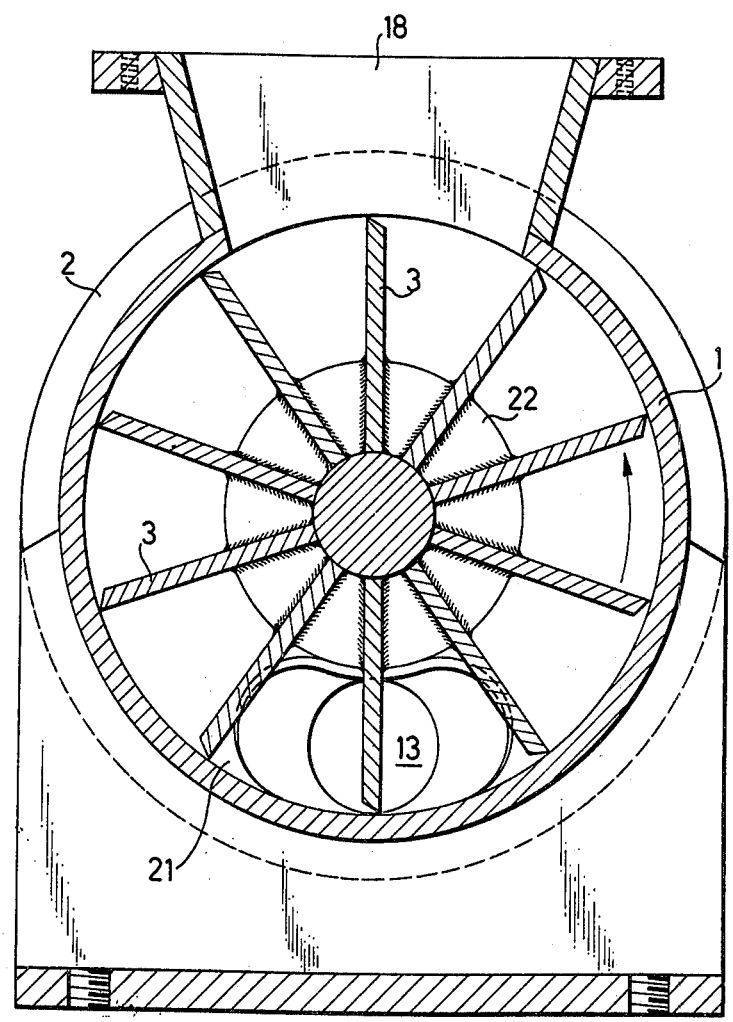

The feeding device according to the invention will now be described in further detail and by way of example with reference to the accompanying drawing of which:

FIG. 1 is a generally cross sectional view parallel to the axis of the rotor and FIG. 2 is a cross sectional view taken at right angles to the axis of the rotor.

The casing of the rotary valve consists of a cylindrical jacket 1 closed by side plates 2, 2' and is provided with a product inlet opening (18). The rotor is composed of a partially conical hub 22 carrying blades 3. At its opposite ends the rotor hub is provided with stub shafts 5, 5' and at least one end of the rotor hub is recessed as at 6 whereby an annular duct 7 is formed with the side plate 2. The shafts 5, 5' are provided with splines 17, 17' engaging the bushings 15, 15' to cause the bushings to rotate with the shaft. In the bearing boxes 10, 10' which are secured to the side plates 2, 2' there are arranged bearing rings 14, 14', sealing rings 23, 23', intermediate rings 20, 20' and sealing ring (9, 9'). The bearing boxes 10, 10' are further provided with the bores 8, 8' through which air under pressure is supplied to the sealing rings 23, 23' and 9, 9'. The bearing rings 14, 14' are held in place by rings 16, 16'. Furthermore, the bearing boxes are provided with openings 19, 19' through which the material being conveyed can be discharged in the case of a possible leakage without damaging the bearings. To prevent leakage of material between the side plate 2 and rotor hub compressed air is introduced through conduit 4 into the annular duct 7 between the plate 2 and hub 22.

The plate 2' is also provided with an inlet opening 11 through which the transporting medium for the solid material, for example air, can be introduced into at least one of the pockets 21 of the rotor. The air/solid mixture leaves the pocket 21 through outlet opening 13 in plate 2. The outlet opening has a dimension such that it extends over at least two pockets of the rotor. The increase in diameter of the shaft between plate 2' and plate 2 is in the range of from 1:1.4 to 1:3. The dimensions of the outlet opening 13 are chosen in such a manner that in the direction of transport of the air/solid mixture no dead spaces are formed on plate 2. The outlet tube 24 narrows in the direction away from the outlet opening 13. Shaft 5' is provided with a further spline 25 for coupling the shaft to a motor (not shown).

With the device according to the invention the rotary valve can be discharged pneumatically without the usual leakages occuring at the side plates of the casing and an optimum discharge of the rotor pockets is ensured.

What is claimed is:

1. A particulate material feeding device comprising a casing having a cylindrical rotor chamber therein, an inlet for particulate material formed in said casing, a pressure fluid inlet and a material-fluid outlet formed in opposite walls of said casing, said pressure fluid inlet and said outlet being axially aligned with one another and circumferentially spaced from said particulate material inlet, a rotor mounted for rotation in said chamber, said rotor having a hub and a plurality of radial blades which, together with the peripheral wall of said chamber, define a series of circumferentially arranged pockets that upon rotation of said rotor come sequentially into registry with said pressure fluid inlet and said material-fluid outlet, said rotor hub having an outer surface that diverges in the direction of the outlet wall of said casing to cause the cross-sectional area of said pockets to decrease between said pressure fluid inlet and said material-fluid outlet, said outlet being of such size and configuration as to register simultaneously with at least two of said rotor pockets, whereby no part of said outlet obstructs any part of the discharge end of a pocket in registry therewith.

2. A particulate material feeding device comprising a casing having a cylindrical rotor chamber therein, an inlet for particulate material formed in said casing, a pressure fluid inlet and a material-fluid outlet formed in opposite walls of said casing, said pressure fluid inlet and said outlet being axially aligned with one another and circumferentially spaced from said particulate material inlet, a rotor mounted for rotation in said chamber, said rotor having a hub and a plurality of radial blades which, together with the peripheral wall of said chamber, define a series of circumferentially arranged pockets that upon rotation of said rotor come sequentially into registry with said pressure fluid inlet and said material-fluid outlet, said rotor hub having an outer surface that diverges in the direction of the outlet wall of said casing to cause the cross-sectional area of said pockets to decrease between said pressure fluid inlet and said material-fluid outlet, said outlet being of such size and configuration as to register simultaneously with at least two of said rotor pockets, whereby no part of said outlet obstructs any part of the discharge end of a pocket in registry therewith, said rotor having an end surface adjacent to said outlet wall that is recessed to define with said outlet wall an annular duct and said outlet wall being provided with a pressure fluid inlet communicating with said duct, whereby pressure fluid can be introduced into said duct to provide a seal that prevents migration of said particulate material between said outlet wall and said rotor.

3. A particulate material feeding device according to claim 2 wherein the outer surface of said hub comprises a cylindrical portion adjacent to said inlet wall and a frusto-conical portion adjacent to said outlet wall.

4. A particulate material feeding device according to claim 2 including a pressure fluid inlet conduit connected to said pressure fluid inlet and a material-fluid outlet conduit connected to said material-fluid outlet, the portion of said material-fluid outlet conduit adjacent to said material-fluid outlet being of such size and configuration as to register with at least two of said pockets.

* * * * *